Sept. 1, 1931.  H. D. MUNSON ET AL  1,821,524
FLUID TRANSMISSION
Filed Dec. 17, 1928   2 Sheets-Sheet 1
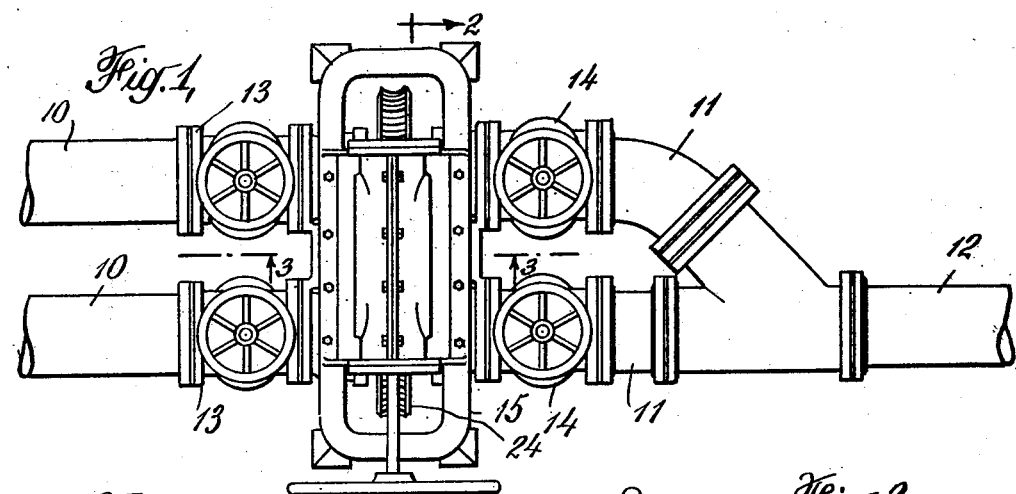
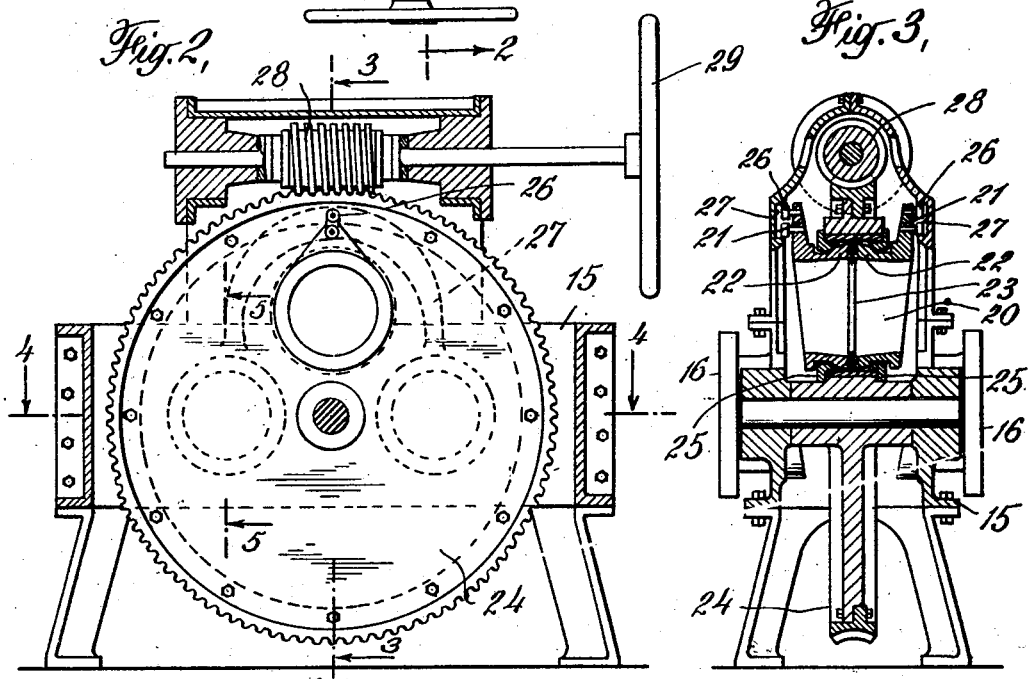
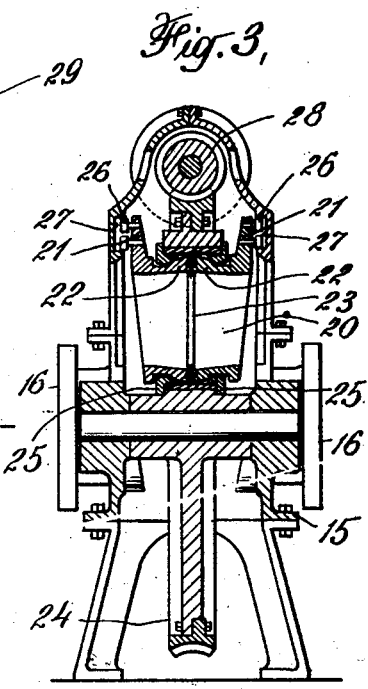
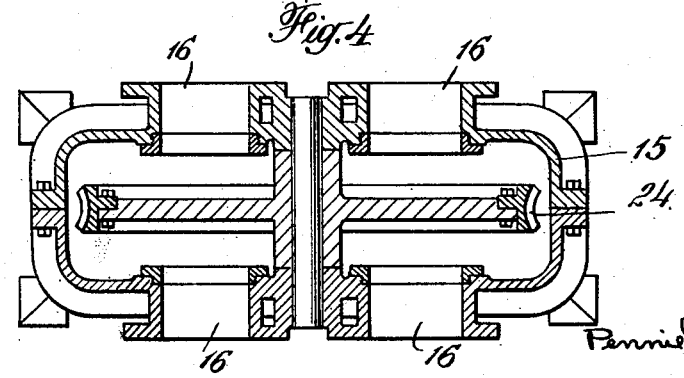
INVENTORS
Horace D. Munson
Gregory A. Petroe
BY
Pennie, Davis, Marvin & Edmonds
ATTORNEYS

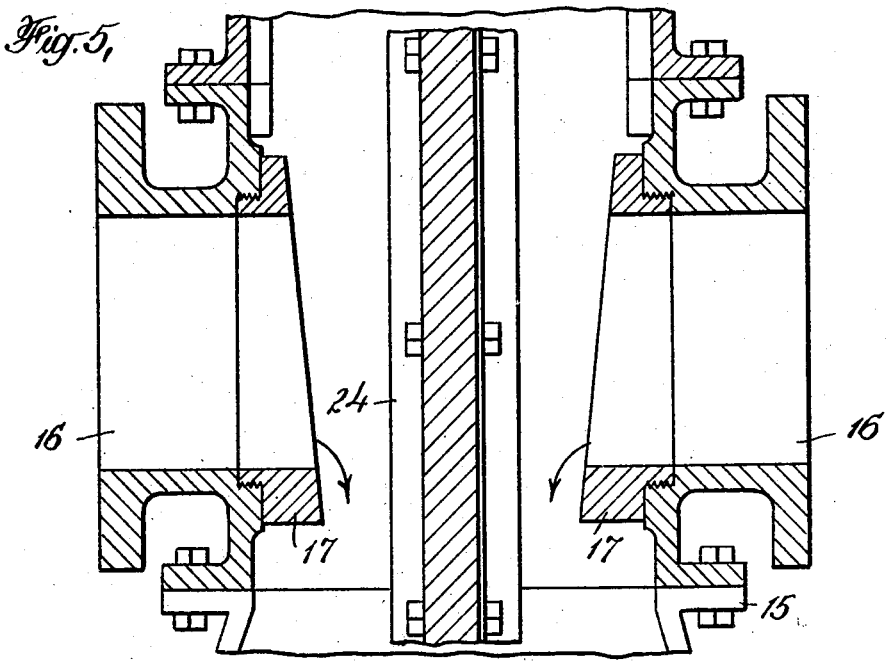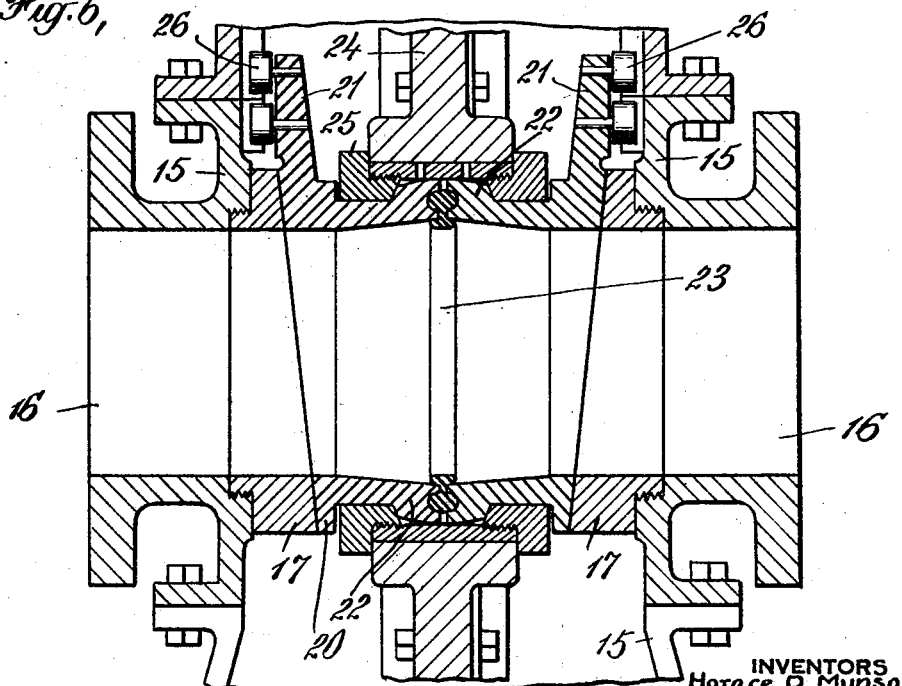

Patented Sept. 1, 1931

1,821,524

UNITED STATES PATENT OFFICE

HORACE D. MUNSON AND GREGORY A. PETROE, OF NIAGARA FALLS, NEW YORK, ASSIGNORS TO THE MATHIESON ALKALI WORKS, INC., OF NEW YORK, N. Y., A CORPORATION OF VIRGINIA

FLUID TRANSMISSION

Application filed December 17, 1928. Serial No. 326,609.

This invention relates to fluid transmission and distribution and has for an object the provision of improved apparatus for controlling the flow of fluids. More particularly, the invention contemplates the provision of improved apparatus for selectively connecting a fluid supply line with different sources of supply of fluid.

In many instances two or more fluids are used for different or similar purposes for general plant use or for particular processes. When such fluids may be used interchangeably or at different times, it is desirable to provide as few supply lines as possible, preferably one, for conducting the fluids from a convenient point of supply to the point or points at which they are used. Thus, at some plants, two sources of water supply (potable and non-potable) may be available and may be used at different times. A complete plant supply system may be rather extensive and it is desirable, if possible, to provide but one system. When a single plant system is used, the means for changing from one source to the other should provide for the elimination of possibilities of contamination resulting from leakage or accidental manipulation of the changing means.

The present invention, in one of its aspects, contemplates the provision of means for selectively connecting a fluid supply line with different sources of supply which substantially eliminates the possibility of contamination of one fluid by another through leakage or accidental manipulation.

Apparatus constructed in accordance with the principles of the present invention comprises a plurality of feed lines each connected with a source of supply of a particular fluid and each terminating with an open end adjacent to and in alignment with an open end of a branch supply line communicating with a main supply line. Each feed line and each branch supply line is provided with a control valve adjacent its end. The adjacent ends of the feed lines and branch supply lines are spaced apart for the accommodation of a pipe section which is adapted to fit between an end of a feed line and an end of a branch supply line and join them to form a continuous conduit between a source of supply and a point of delivery of a fluid. The pipe section may be a section of any suitable form of fluid conduit. The pipe section is preferably so mounted and so formed that it may be readily shifted to any desired position between the adjacent ends of a feed line and a branch supply line to form a tight and efficient connection therebetween.

The invention will be better understood from a consideration of the following description taken in conjunction with the accompanying drawings in which is shown one of the preferred embodiments of the invention, and in which Fig. 1 is a plan of apparatus embodying the invention;

Fig. 2 is a sectional elevation taken substantially along line 2—2 of Fig. 1;

Fig. 3 is a sectional elevation taken substantially along line 3—3 of Fig. 2;

Fig. 4 is a sectional plan taken substantially along line 4—4 of Fig. 2;

Fig. 5 is an enlarged section taken substantially along line 5—5 of Fig. 2 and showing the spaced ends of a feed line and a branch supply line; and Fig. 6 is a section similar to that shown in Fig. 5, but showing the movable pipe section in position between the spaced ends of a feed line and a branch supply line.

The apparatus shown in the drawings comprises a plurality of feed lines 10 which may be connected with sources of fluid supply (not shown), and a plurality of branch supply lines 11 communicating with a main supply line 12. Each feed line is in alignment with a branch supply line and terminates adjacent an end of a branch supply line. Valves 13 and 14 having flanged ends are mounted on the ends of the feed lines and branch supply lines, and provide means for controlling the flow of fluid therethrough. The adjacent ends of the valves 13 and 14 are uniformly spaced apart.

A metal casing 15 is mounted in the space between the adjacent ends of the valves 13 and 14. The casing 15 is open at the top and bottom and is provided with openings 16 in its opposite side walls, opposite openings being in alignment, and the openings being so spaced as to be capable of being placed in alignment with the feed lines and branch supply lines. Outer flanges surround the openings 16 and provide means for attaching the casing 15 to the valves 13 and 14 and thus locking the openings 16 in alignment with the feed lines and branch supply lines. The inner peripheral edges of the openings 16 are provided with removable flanged bushings 17, which are preferably formed of a relatively soft material, such for example, as copper, bronze, rubber, or fiber composition. The bushings 17 are bevelled so that when they are in position their exposed end faces slope downwardly and inwardly toward the center of the casing 15. A pipe section 20 is provided with end faces which are complementary to the exposed end faces of the bushings 17. The construction and arrangement is such that the pipe section 20 may be wedged tightly between the inner faces of the bushings 17 to form fluid tight joints.

The pipe section 20 comprises two interchangeable substantially cylindrical units, each provided with an outwardly projecting lug or extension 21 adjacent one end, and an outer annular ridge 22 adjacent the other end. The end face of each unit adjacent the annular ridge is provided with a groove for the reception of a relatively soft gasket 23.

The assembled pipe section 20 is mounted eccentrically in a threaded opening in the disk portion or solid web of a wormwheel 24 mounted for rotation within the casing 15. The separate units of the pipe section are held in position by means of threaded collars 25 which bear against the annular ridges 22. The axes of the pipe section 20 and the openings 16 are uniformly spaced from the axis of rotation of the wormwheel 24.

The pipe section 20 is so mounted as to permit it to rotate relatively to the wormwheel as the wormwheel is rotated. Rollers 26 are mounted on the extensions 21 and extend into the guideways 27 formed in the side walls of the casing 15.

A worm 28 is operatively associated with the wormwheel 24 and a handwheel 29 is provided for rotating the worm 28 and thus rotating the wormwheel 24.

In the operation of the apparatus, the pipe section 20 may be in a neutral or inoperative position out of alignment with the openings 16 when the supply line is not in use. In such a case all of the valves 13 and 14 are closed. When it is desired to draw fluid from a particular source of supply, the handwheel may be manipulated to rotate the wormwheel and move the pipe section 20 into alignment with the openings 16 which communicate with a feed line connected with that particular source of supply. A complete, closed conduit, including a feed line 10, a branch supply line 11 and the pipe section 20, is thus formed between the main supply line 12 and the source of supply. A thoroughly fluid tight connection is formed because of the wedging action resulting from the substantially wedge-shaped construction of the pipe section and the provision of the relatively soft bushings surrounding the openings 16. This wedging action is further aided by the gasket 23 disposed between the units of the pipe section. The guideway 27 and rollers 26 serve to maintain the pipe section in such positions that it may readily enter the spaces between adjacent feed lines and branch supply lines.

When a complete conduit has been formed by placing the pipe section in position between the ends of a particular feed line and a branch supply line, the valves 13 and 14 disposed in those lines may be opened to permit the fluid to flow into the main supply line. In changing to another source of supply, these valves are closed, the pipe section moved into position to connect the proper feed line with its corresponding branch supply line, and the valves 13 and 14 disposed in those lines are opened.

When no fluid is being drawn from any source of supply the pipe section is preferably disposed in an inoperative position as illustrated in Fig. 2, and all of the valves 13 and 14 are closed. In such cases, leakage or accidental opening of any of the valves 13 and 14 cannot result in contamination of the fluid of one source by the fluid of another, for the adjacent ends of the feed and branch supply lines are spaced apart and the solid web of the wormwheel 27 extends therebetween. Also, in cases in which fluid is being withdrawn from one particular source, the feed lines communicating with other sources are entirely cut off from the main supply line. Any fluid escaping from the various lines may escape from the casing through the openings therein. In the case of liquids, leakage may drain from the casing through the open bottom into a suitable sewer drain.

We claim:

1. Apparatus for transmitting and distributing fluids comprising a plurality of valve controlled fluid conduits adapted to communicate with different sources of supply of fluid and each having an end disposed adjacent an end of another fluid conduit in spaced relation thereto, and a pipe section movable into position between the spaced ends of said conduits to form connections therebetween.

2. Apparatus of the class described comprising a plurality of valve controlled fluid conduits adapted to communicate with different sources of supply of fluid and each having an end disposed adjacent an end of another fluid conduit in spaced relation thereto, a rotatable support disposed between the spaced ends of said conduits, a pipe section mounted on said support, and means for rotating said support to selectively position said pipe section between the spaced ends of said conduits.

3. Apparatus of the class described comprising a main supply line, a plurality of branch supply lines communicating with said main supply line and having free ends provided with valves, a plurality of feed lines adapted to communicate with different sources of supply of fluid and having free ends provided with valves and disposed adjacent the free ends of said branch supply lines in spaced relation thereto, a movable pipe section, and means for selectively positioning said pipe section between the free ends of said feedlines and said branch supply lines to form connections therebetween.

4. Apparatus of the class described comprising a main supply line, a plurality of branch supply lines communicating with said main supply line and having free ends provided with valves, a plurality of feed lines adapted to communicate with different sources of supply of fluid and having free ends provided with valves and disposed adjacent the free ends of said branch supply lines in spaced relation thereto, a rotatable support disposed between the free ends of said lines, a pipe section mounted on said support, and means for rotating said support to selectively position said pipe section between the free ends of said feed lines and said branch supply lines to form connections therebetween.

5. Apparatus of the class described comprising a main supply line, a plurality of branch supply lines communicating with said main supply line and having free ends provided with valves, a plurality of feed lines adapted to communicate with different sources of supply of fluid and having free ends provided with valves and disposed adjacent the free ends of said branch supply lines, the planes of the free end faces of said lines converging downwardly, a rotatable support disposed between the free ends of said lines, a substantially wedge-shaped pipe section mounted on said support and adapted to rotate relatively thereto, means for rotating said support, and guide means for controlling the movement of said pipe section.

6. Apparatus of the class described comprising a main supply line, a plurality of branch supply lines communicating with said main supply line and having free ends provided with valves, a plurality of feed lines adapted to communicate with different sources of supply of fluid and having free ends provided with valves and disposed adjacent the free ends of said branch supply lines, the planes of the free end faces of said lines converging, a rotatable support disposed between the free ends of said lines, a pipe section mounted on said support and having faces complementary to the end faces of said lines, and means for rotating said support.

7. In an apparatus for controlling the flow of fluid in fluid-distribution systems, a control casing, a plurality of valve-controlled supply mains communicating with said casing, a discharge main communicating with said casing, a movable disk member in said casing between the supply mains and the discharge main, a pipe section carried by said disk member and adapted upon movement of the disk member to connect either of said supply mains to the discharge main, said casing having a waste outlet, said waste outlet being in communication with the supply mains which are not connected to the discharge main by said pipe section, whereby any leakage past the valves of said supply mains is prevented from entering the discharge main.

In testimony whereof we affix our signatures.

HORACE D. MUNSON.
GREGORY A. PETROE.